F. W. SMITH, Jr.
ACCOUNT DEPOSIT BOOK.
APPLICATION FILED OCT. 11, 1916.
1,252,961.
Patented Jan. 8, 1918.
2 SHEETS—SHEET 1.
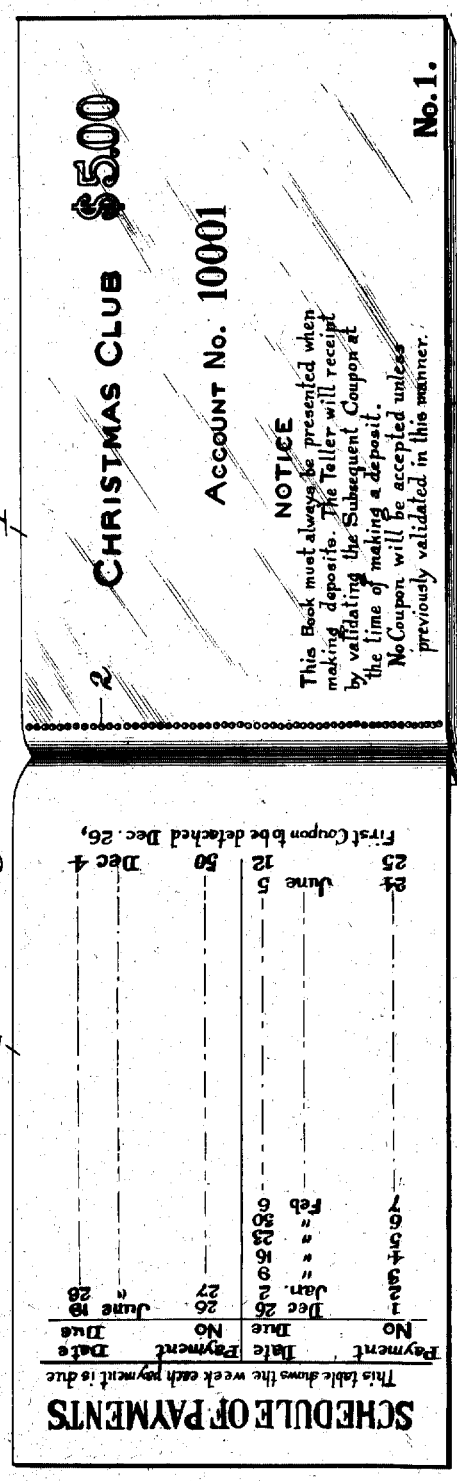
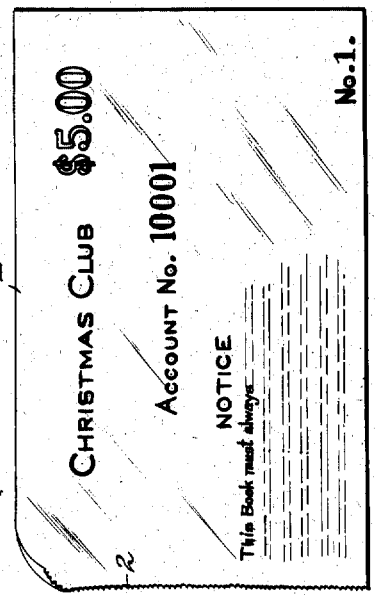
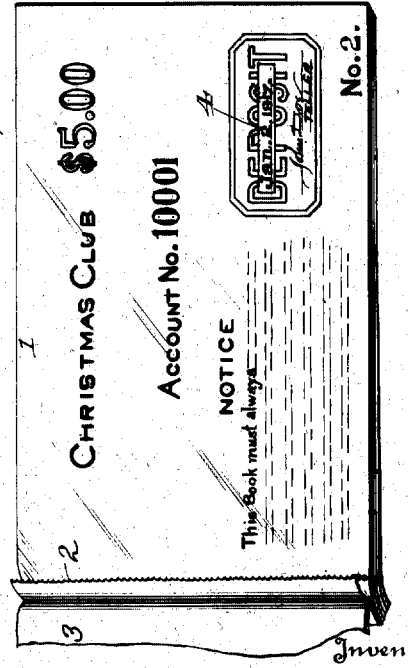
Inventor
*FRIEND W. SMITH, JR.*
By Dodge and Sons
Attorneys F. W. SMITH, Jr.
ACCOUNT DEPOSIT BOOK.
APPLICATION FILED OCT. 11, 1916.

1,252,961.

Patented Jan. 8, 1918.
2 SHEETS—SHEET 2.

SCHEDULE OF PAYMENTS

This table shows the week each payment is due

| Payment No | Date Due | Payment No | Date Due |
|---|---|---|---|
| 1 | Dec 26 | 26 | June 19 |
| 2 | Jan. 2 | 27 | " 26 |
| 3 | " 9 | | |
| 4 | " 16 | | |
| 5 | " 23 | | |
| 6 | " 30 | | |
| 7 | Feb 6 | | |
| 8 | " 13 | | |
| 24 | June 5 | 50 | Dec. 4 |
| 25 | " 12 | | |

First Coupon to be detached Dec. 26, 1916 and succeeding Coupon to be punched in space containing numeral "2"

*Fig. 4.*

No. 1.  ACCOUNT No
10001

1  DECEMBER
2  NOTICE
3  At each deposit the immediately succeeding Coupon must be punched in the space whose number corresponds with the deposit date for such Coupon.
4  No Coupon accepted for deposit unless previously punched in this manner.
5
6

$5.00

*Fig. 3.*

No. 1.  ACCOUNT No
10001

1  DECEMBER
2  NOTICE
3  At each deposit the immediately succeeding Coupon must be punched in the space whose number corresponds with the deposit date for such Coupon.
4  No Coupon accepted for deposit unless previously punched in this manner.
5
6

$5.00

*Fig. 5.*

...tached Dec. 26, 1916 and succeeding Coupon to be punched in space containing numeral "2"

No. 2.  ACCOUNT No
10001

1  JANUARY
2  NOTICE
3  At each deposit the immediately succeeding Coupon must be punched in the space whose number corresponds with the deposit date for such Coupon.
4  No Coupon accepted for deposit unless previously punched in this manner.
5
6

Inventor:
FRIEND W. SMITH JR.
By Dodge and Sons,
Attorneys

UNITED STATES PATENT OFFICE.

FRIEND W. SMITH, JR., OF BRIDGEPORT, CONNECTICUT, ASSIGNOR TO JOHN W. HIBBARD, OF NEW YORK, N. Y.

ACCOUNT DEPOSIT-BOOK.

1,252,961.

Specification of Letters Patent. Patented Jan. 8, 1918.

Application filed October 11, 1916. Serial No. 125,115.

*To all whom it may concern:*

Be it known that I, FRIEND W. SMITH, Jr., a citizen of the United States, residing at Bridgeport, in the county of Fairfield and State of Connecticut, have invented a certain new and useful Improvement in Account Deposit-Books, of which the following is a specification.

My present invention pertains to an improved account deposit book, the construction and advantages of which will be hereinafter set forth, reference being had to the annexed drawings, wherein:

Figure 1 is a perspective view of a book, with the upper cover-board thrown back, illustrating one embodiment of the invention;

Fig. 2 a similar view showing the first leaf removed and the second leaf validated, the cover-board being broken away;

Fig. 3 a perspective view of a book illustrative of another embodiment of the invention;

Fig. 4 a similar view of the first removed leaf; and

Fig. 5 a like view showing the manner in which the next succeeding leaf, in this instance the second leaf, is validated upon the removal of the immediately preceding leaf.

Of late there has come into vogue a special form of savings account, now commonly known as "Christmas accounts", "Thrift clubs", and the like, under which a specified number of payments is made during the calendar year, usually one a week, and at the end of the specified period the depositor is entitled to withdraw a fixed or determinate amount, commonly the amount paid in plus the agreed interest or a bonus on such amount. The present invention has to do with the handling of such accounts.

The main object of the invention is to produce a book which lends itself to the ready use of keeping track of such a special account between a banking institution and a particular customer or depositor, the structure being such as to facilitate the transaction between the bank and the customer at each time of payment, and the making of such a record that both parties will have in their possession a record of what has been done or paid.

Inasmuch as most, if not all, of the accounts which the book may establish require a payment on given days, it is necessary that the payments be handled with facility, in order to avoid delay and waiting on the part of the customers.

Referring first to Figs. 1 and 2, 1 denotes the leaves, preferably perforated as at 2, to admit of ready detachment of the leaf, and 3 the front cover-board. The latter will preferably have a table or schedule of payments appearing thereon and in the form illustrated shows the number of payments and the date when each is due and payable. The cover-board will also contain such other printed matter, as directions and rules, as may be desired by any particular institution employing the books. The leaves will bear serial designations, as 1, 2, 3, etc., and each will preferably bear an account number, as 10,001, which number is placed against the depositor's name in the bank's records. The leaves may also contain any notice or rule found desirable to facilitate the carrying out of the transaction and also any other matter such as "Christmas Club" and $5.00, the latter indicating the total sum which is eventually paid in on the account, say in fifty payments of ten cents each.

In opening an account, the bank takes the name of a customer, assigns the same a particular number and issues a book; upon the payment of the first instalment, the teller (or other officer) removes the first leaf (No. 1) and validates leaf number 2, by imprinting any suitable matter thereon, as for instance, the word "Deposit" with the date of the next payment, as indicated at 4. A blank space may be left for the reception of this stamp, or it may be imprinted or impressed on any portion thereof; in other words, the entire face of the leaf may be considered a space for the reception of such imprint. The bank, of course, files away the removed leaf or makes a record of payment corresponding to the leaf. The book with the remaining leaves is returned to the depositor. When it is again presented to the bank, the teller will at once see that all previous payments have been made, this by reason of the validating mark upon the then first remaining leaf in the book. The customer will likewise be safeguarded.

In Figs. 3, 4 and 5 the same scheme is present in a slightly different embodiment. The leaves in this instance are shown as serially numbered, but this is not absolutely essential. Each sheet has thereon a series of numerals, from 1 to 31 inclusive, and preferably, as shown, these are arranged in spaces provided along each side or edge of the sheet. Each sheet will preferably have an account-number and will have the month within which its use falls printed thereon, as December, January, etc., there being at least the requisite number of leaves for each month.

When a depositor opens his account, the bank teller removes the first sheet and punches the next coupon. If the first date falls, say, on December 26th, the teller, after removing the first sheet, punches out the numeral 2 on the first January sheet, thereby validating said sheet and indicating the date when the next payment falls due, to wit, January 2nd. When the depositor again comes to the bank, on January 2nd, the teller notes that the January 2nd sheet has been validated, indicating that the previous payment has been made and he, therefore, accepts it, along with the necessary deposit, and punches the next sheet in the space denoted by the numeral 9, thereby validating it and showing the next payment is due January 9th, and so on.

Thus, it will be noted that the bank is protected while the depositor is likewise protected, since he always has in his possession the book whose deposit dates are vouched for by the bank by advance validation.

In order to reduce the printing expense to a minimum, and to render the books available from year to year, there may be five leaves for each month, since in some years there will be five deposit dates in a month and in other years only four. Also, each leaf has thirty-one punching spaces, because some months have thirty-one days and it is cheaper to print thirty-one spaces on each leaf rather than to print the proper spaces for each month. Each batch of five coupons has printed thereon its proper month and where there are only four deposit-dates in a month the teller tears out and casts away the extra coupon for that month when the last payment, to wit, the fourth, is made for that month. Inasmuch as the schedule of payments is always before the teller, he can punch the proper number without fear of confusion.

Where extra leaves are present, the leaves for each month might be serially numbered instead of being numbered consecutively throughout the book.

Under both forms described it will be noted that the validation of the sheet immediately following the sheet removed by the teller completes the operation and secures a record both to the bank and to the customer or depositor. Either arrangement permits ready despatch of the business.

Having thus described my invention, what I claim is:

A deposit book adapted, by the validation of each sheet by a bank official, to indicate that the previous payments have been made and likewise to indicate the date of the next payment, said sheet thus validated being adapted to be removed from the book and retained by the bank as a record of payment as the next succeeding sheet is validated, comprising a plurality of detachable leaves, said leaves throughout having a common designation and an indicia of the amounts to be paid and also being sequentially marked, each leaf having a space for the validation thereof by the marking thereon of the date when the deposit becomes payable.

In testimony whereof I have signed my name to this specification.

FRIEND W. SMITH, Jr.